US012715776B2

(12) United States Patent
Lew et al.

(10) Patent No.: US 12,715,776 B2

(45) Date of Patent: Aug. 25, 2026

(54) METHOD FOR PREPARING HIGH-SILICA Y ZEOLITE

(71) Applicant: Chevron U.S.A. Inc., San Ramon, CA (US)

(72) Inventors: Christopher Michael Lew, Alameda, CA (US); Rebecca Edyne MacLean, Pleasanton, CA (US); Kurt Owen Jensen, Richmond, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 499 days.

(21) Appl. No.: 18/359,247

(22) Filed: Jul. 26, 2023

(65) Prior Publication Data

US 2025/0033984 A1 Jan. 30, 2025

(51) Int. Cl.
*C01B 39/02* (2006.01)

(52) U.S. Cl.
CPC .................................. *C01B 39/026* (2013.01)

(58) Field of Classification Search
CPC ............................ C01B 39/026; C01B 39/205
See application file for complete search history.

(56) References Cited

U.S. PATENT DOCUMENTS 3,130,007 A 4/1964 Breck
4,333,859 A 6/1982 Vaughan et al.
4,714,601 A 12/1987 Vaughan
4,931,267 A 6/1990 Vaughan et al.
9,738,538 B2 8/2017 Yuan et al.
10,252,917 B2 4/2019 Yuan et al.
10,828,625 B2 11/2020 Schmidt et al.
2018/0134571 A1* 5/2018 Zones .................... C01B 39/48
2022/0306481 A1 9/2022 Tian et al.

FOREIGN PATENT DOCUMENTS

EP 3081532 A1 10/2016

OTHER PUBLICATIONS

Yun Kyung Kim, Kizhakke Palleeri Rajesh, Jong-Sung Yu, "Zeolite materials prepared using silicate waste from template synthesis of ordered mesoporous carbon", Sep. 15, 2013, Elsevier, vol. 260, pp. 350-357. (Year: 2013).*

PCT International Search Report, International application No. PCT/US2024/039108, mailed Oct. 22, 2024.

(Continued)

*Primary Examiner* — Christina A Johnson
*Assistant Examiner* — David Andrew Calderon

(57) ABSTRACT

A method is disclosed for making a high-silica zeolite having an FAU framework structure. The method includes: (1) preparing a reaction mixture comprising: (a) a source of silica; (b) a source of alumina; (c) a source of an alkali or alkaline earth metal cation; (d) an organic structure directing agent containing at least one cation selected from a 1,2-dimethyl-3-(3-methylbenzyl) imidazolium cation, a 1-ethyl-3-methylimidazolium cation, and a 1-butyl-3-methylimidazolium cation; (e) a source of hydroxide ions; and (f) water; (2) heating the reaction mixture under crystallization conditions including a temperature of from 80° C. to 200° C. for a time sufficient to form crystals of the high-silica zeolite; and (3) recovering at least a portion of the high-silica zeolite from step (2).

10 Claims, 1 Drawing Sheet

(56) References Cited

OTHER PUBLICATIONS

D. Yuan, D. He, S. Xu, Z. Song, M. Zhang, Y. Wei, Y. He, S. Xu, Z. Liu and Y. Xu "Imidazolium-based ionic liquids as novel organic SDA to synthesize high-silica Y zeolite" Micropor. Mesopor. Mater. 2015, 204, 1-7.

F. Delprato, L. Delmotte, J.L. Guth and L Huve "Synthesis of new silica-rich cubic and hexagonal faujasites using crown-ether-based supramolecules as templates" Zeolites 1990, 10, 546-552.

* cited by examiner

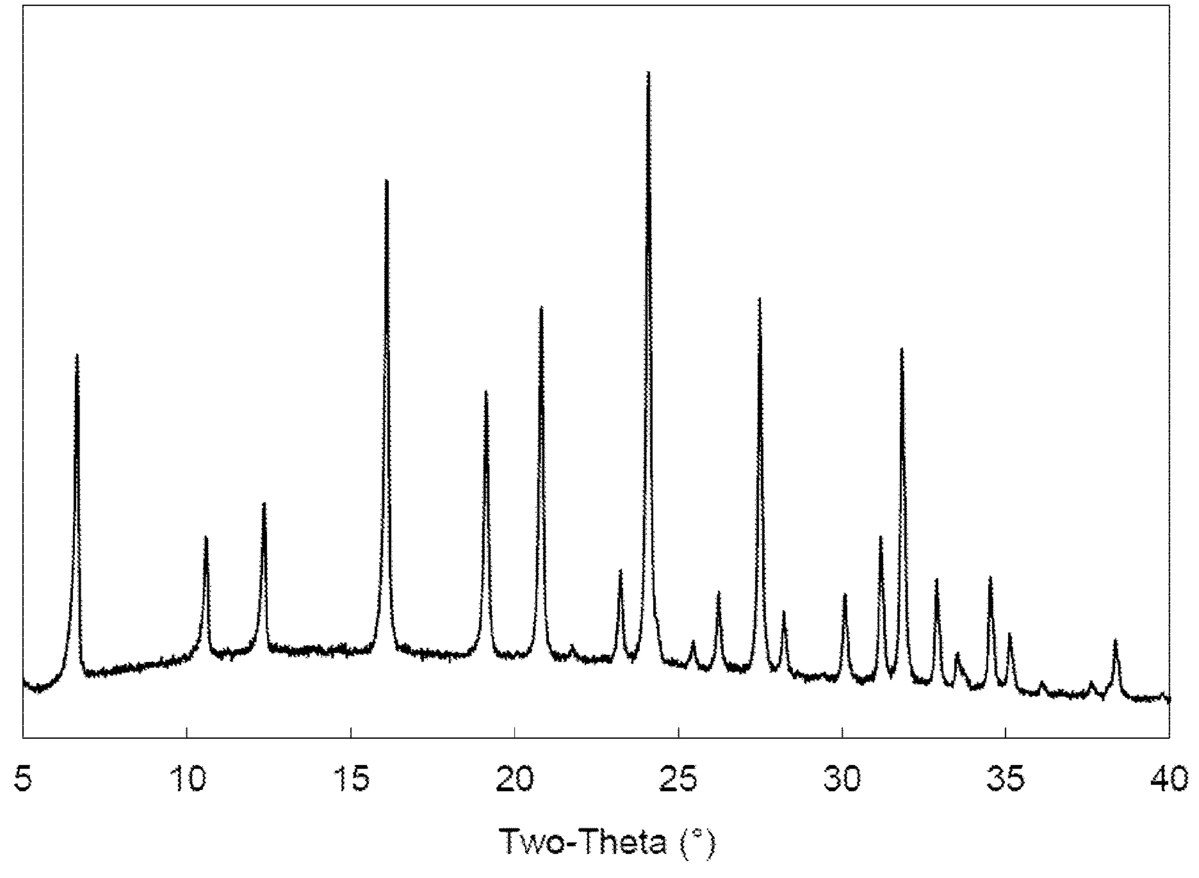
5
10
15
20
25
30
35
40
Two-Theta (°)

METHOD FOR PREPARING HIGH-SILICA Y ZEOLITE

FIELD

The present invention relates to a method for preparing high-silica Y zeolite having FAU framework topology.

BACKGROUND

Y-type zeolite is an aluminosilicate zeolite having FAU framework topology. Y-type zeolite with a $SiO_2/Al_2O_3$ molar ratio of 3-5 has been widely used as a catalyst in oil refining, particularly for fluid catalytic cracking (FCC) processes. The framework $SiO_2/Al_2O_3$ molar ratio of Y-type zeolite plays a decisive role in its catalytic performance. The higher the $SiO_2/Al_2O_3$ molar ratio, the better the catalytic activity and stability. The high-silica Y-type zeolite currently used in industry is mainly obtained by chemical/physical dealumination methods. However, post-synthetic dealumination is an extra processing step and can reduce crystallinity.

Therefore, methods for the direct synthesis of Y-type zeolite having high silica-alumina ratio ($SiO_2/Al_2O_3$ molar ratio >6) are of great significance.

SUMMARY

In a first embodiment, the present disclosure relates to a method of making a high-silica zeolite having an FAU framework structure, the method comprising: (1) preparing a reaction mixture comprising: (a) a source of silica; (b) a source of alumina; (c) a source of an alkali or alkaline earth metal cation [M]; (d) an organic structure directing agent [Q] comprising at least one cation selected from a 1,2-dimethyl-3-(3-methylbenzyl) imidazolium cation, a 1-ethyl-3-methylimidazolium cation, and a 1-butyl-3-methylimidazolium cation; (e) a source of hydroxide ions [OH]; and (f) water; (2) heating the reaction mixture under crystallization conditions including a temperature of from 80° C. to 200° C. for a time sufficient to form crystals of the high-silica zeolite; and (3) recovering at least a portion of the high-silica zeolite from step (2).

In a second embodiment, the present disclosure relates to a high-silica zeolite having an FAU framework structure and, in its as-synthesized form, comprising at least one cation selected from a 1,2-dimethyl-3-(3-methylbenzyl) imidazolium cation, a 1-ethyl-3-methylimidazolium cation, and a 1-butyl-3-methylimidazolium cation in its pores.

BRIEF DESCRIPTION OF THE DRAWINGS

FIG. 1 shows a powder X-ray diffraction (XRD) pattern of the as-synthesized product of Example 1.

DETAILED DESCRIPTION

The "as-synthesized" (or "as-made") zeolites of the present disclosure (i.e., before thermal treatment or other treatment to remove the organic structure directing agent from the pores) typically include the organic structure directing agent, one of the components of the reaction mixture, within their pores. The zeolites of the present disclosure where part or all of the organic structure directing agent has been removed (e.g., via thermal treatment or other treatment to remove the organic structure directing agent from the pores), are at least partially calcined or "as-calcined" materials.

As used herein, the term "FAU" refers to the FAU type topology or framework as recognized by the International Zeolite Association (IZA) Structure Commission and the term "FAU zeolite" means an aluminosilicate in which the primary crystalline phase is FAU.

A high-silica zeolite of FAU framework structure may be synthesized by: (1) preparing a reaction mixture comprising: (a) a source of silica; (b) a source of alumina; (c) a source of an alkali or alkaline earth metal cation [M]; (d) an organic structure directing agent [Q] comprising at least one cation selected from a 1,2-dimethyl-3-(3-methylbenzyl) imidazolium cation, a 1-ethyl-3-methylimidazolium cation, and a 1-butyl-3-methylimidazolium cation; (e) a source of hydroxide ions [OH]; and (f) water; (2) heating the reaction mixture under crystallization conditions including a temperature of from 80° C. to 200° C. for a time sufficient to form crystals of the high-silica zeolite; and (3) recovering at least a portion of the high-silica zeolite from step (2).

The reaction mixture can have a composition, in terms of molar ratios, within the ranges set forth in Table 1:

TABLE 1

| | Broadest | Secondary |
|---|---|---|
| $SiO_2/Al_2O_3$ | 5 to 30 | 7 to 20 |
| $M/SiO_2$ | 0.05 to 0.90 | 0.10 to 0.70 |
| $Q/SiO_2$ | 0.05 to 0.30 | 0.10 to 0.25 |
| $OH/SiO_2$ | 0.10 to 1.20 | 0.20 to 0.95 |
| $H_2O/SiO_2$ | 10 to 60 | 15 to 40 |

The reaction mixture comprises at least one source of silica. Suitable sources of silica include alkali metal silicates such as potassium silicate and sodium silicate, fumed silica, colloidal silica, precipitated silica, and silicon alkoxides (e.g., tetramethyl orthosilicate, tetraethyl orthosilicate).

The reaction mixture comprises at least one source of alumina. Suitable sources of alumina include hydrated alumina, aluminum hydroxide, alkali metal aluminates (e.g., sodium aluminate), aluminum alkoxides, water-soluble aluminum salts (e.g., aluminum nitrate, aluminum sulfate), and aluminosilicate zeolites such as zeolite Y (FAU). Preferably, the $SiO_2/Al_2O_3$ molar ratio of the zeolite is from 2 to less than 6, more preferably from 3 to 5.5, and most preferably from 3 to 5.2. Where zeolites are the alumina source, the cation type may be at least one type selected from the group consisting of sodium type ($Na^+$ type), proton type ($H^+$ type), and ammonium type ($NH_4^+$ type), where ammonium type is preferred.

The reaction mixture contains one or more sources of alkali or alkaline earth metal cation [M]. M is preferably selected from the group consisting of sodium, potassium, lithium, rubidium, calcium, magnesium, and mixtures thereof, preferably sodium and/or potassium, more preferably sodium. The sodium source, when present, may be sodium hydroxide, sodium aluminate, sodium silicate, sodium aluminate or sodium salts such as NaCl, NaBr or sodium nitrate. The potassium source, when present, may be potassium hydroxide, potassium aluminate, potassium silicate, a potassium salt such as KCl or KBr or potassium nitrate. The lithium source, when present, may be lithium hydroxide or lithium salts such as LiCl, LiBr, LiI, lithium nitrate, or lithium sulfate. The rubidium source, when present, may be rubidium hydroxide or rubidium salts such as RbCl, RbBr, RbI or rubidium nitrate. The calcium source, when present, may be calcium hydroxide, for example. The magnesium source, when present, may be magnesium hydroxide, for example. The alkali or alkaline earth metal cation M may also be present in the one or more sources of an alumina, such as sodium aluminate or potassium aluminate, and/or in the one or more sources of silica, such as sodium silicate and/or potassium silicate.

The organic structure directing agent [Q] comprises at least one cation selected from the group consisting of a 1,2-dimethyl-3-(3-methylbenzyl) imidazolium cation of structure (1), a 1-ethyl-3-methylimidazolium cation of structure (2), and a 1-butyl-3-methylimidazolium cation of structure (3):

(1)

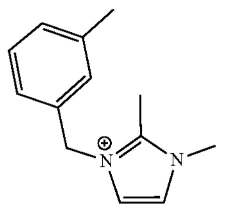

1,2-dimethyl-3-(3-methylbenzyl)imidazolium cation (2)

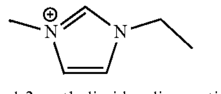

1-ethyl-3-methylimidazolium cation (3)

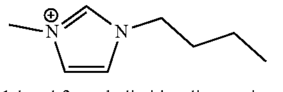

1-butyl-3-methylimidazolium cation

The organic structure directing agent [Q] may be present in any suitable form, for example as a halide, such as a chloride, a bromide or an iodide, or as a hydroxide, for instance in its hydroxide form.

The reaction mixture contains at least one source of hydroxide ions [OH]. For example, hydroxide ions can be present as a counter ion of the organic structure directing agent or by the use of aluminum hydroxide as a source of Al. Suitable sources of hydroxide ions can also be selected from the group consisting of alkali metal hydroxides, alkaline earth metal hydroxides, ammonium hydroxide, and mixtures thereof; such as from sodium hydroxide, potassium hydroxide, lithium hydroxide, rubidium hydroxide, calcium hydroxide, magnesium hydroxide, ammonium hydroxide, and mixtures thereof; more often sodium hydroxide, potassium hydroxide, lithium hydroxide, ammonium hydroxide, and mixtures thereof; most often sodium hydroxide and/or potassium hydroxide.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

The reaction mixture prepared as described above is then subject to crystallization conditions suitable for the high-silica zeolite to form. Crystallization of the high-silica zeolite may be carried out under static or stirred conditions in a suitable reactor vessel, such as for example Teflon® lined or stainless steel autoclaves placed in a convection oven maintained at an appropriate temperature.

The crystallization in step (2) of the method is typically carried out at a temperature of from 80° C. to 200° C. (e.g., 100° C. to 200° C., or 120° C. to 170° C.) for a time sufficient for crystallization to occur at the temperature used. For instance, at higher temperatures, the crystallization time may be reduced. For instance, the crystallization conditions in step (2) of the method may include heating for a period of from 1 day to 30 days (e.g., at least 1 day or at least 3 days up to 21 days or 14 days). The crystallization time can be established by methods known in the art such as by sampling the synthesis mixture at various times and determining the yield and X-ray crystallinity of precipitated solid. Unless indicated otherwise herein, the temperature measured is the temperature of the surrounding environment of the material being heated, for example the temperature of the atmosphere in which the material is heated. Preferably, the crystallization is carried out under autogenous pressure, preferably in an autoclave.

Typically, the high-silica FAU zeolite is formed in solution and can be recovered by standard means, such as by centrifugation or filtration. The separated high-silica zeolite can also be washed, recovered by centrifugation or filtration and dried.

As a result of the crystallization process, the recovered as-made product contains within its pores at least a portion of the organic structure directing agent used in the synthesis. The as-synthesized zeolite recovered from step (3) may thus be subjected to thermal treatment or other treatment to remove part or all of the organic structure directing agent incorporated into its pores during the synthesis. Thermal treatment (e.g., calcination) of the as-synthesized high-silica FAU zeolite typically exposes the materials to high temperatures sufficient to remove part or all of the organic structure directing agent, in an atmosphere selected from air, nitrogen, ozone or a mixture thereof in a furnace. The thermal treatment may be performed at a temperature of from 300° C. to 800° C. (e.g., 400° C. to 650° C.) for a period of time ranging from 1 hour to 10 hours (e.g., 3 hours to 6 hours). The thermal treatment (e.g., calcination) may be carried out in a box furnace in dry air, which has been exposed to a drying tube containing drying agents that remove water from the air. The thermal treatment may first be carried out under a nitrogen atmosphere and then the atmosphere may be switched to air and/or ozone.

The high-silica FAU zeolite may also be subjected to an ion-exchange treatment, for example, with aqueous ammonium salts, such as ammonium nitrates, ammonium chlorides, and ammonium acetates, in order to remove remaining alkali metal cations and/or alkaline earth metal cations and to replace them with protons thereby producing the acid form of the molecular sieve. To the extent desired, the original cations of the as-synthesized material, such as alkali metal cations, can be replaced by ion exchange with other cations. Preferred replacing cations can include hydrogen ions, hydrogen precursor (e.g., ammonium ions), and mixtures thereof. The ion exchange step may take place after the as-made molecular sieve is dried. The ion-exchange step may take place either before or after a calcination step.

The high-silica FAU zeolite synthesized by the methods described can have a $SiO_2/Al_2O_3$ molar ratio of greater than 6 (e.g., at least 6.5, or at least 7, or at least 8 up to 15, 14, 13, 12, 11, or 10). The $SiO_2/Al_2O_3$ molar ratio of zeolites may be determined by conventional analysis.

The synthesis methods described herein can produce high-silica FAU zeolite crystals with a high degree of purity, and preferably are phase pure (i.e., a phase purity of 95% by weight to more than 99% by weight, as determined by Rietveld XRD analysis, for example). The term "phase purity" used herein with respect to a zeolite means the amount of a single crystalline phase of the zeolite (e.g., based on weight) relative to total weight of all phases (crystalline and amorphous) in the zeolite substance. Thus, while other crystalline phases may be present in the high-silica FAU zeolite, the zeolite comprises at least about 95% by weight FAU as a primary crystalline phase, preferably at least 98% by weight percent FAU, and even more preferably at least 99% by weight or at least about 99.9% by weight FAU, wherein the weight percent FAU is provided relative to the total weight of the zeolite crystalline phases present in the composition.

The powder X-ray diffraction data reported herein were collected by standard techniques using copper K-alpha radiation. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following examples are illustrative and are intended to be non-limiting.

Example 1

The following components were added, in order, to a Teflon liner: 5.26 g deionized $H_2O$, 0.53 g NaOH solution (1 M), 3.06 g OSDA 1 solution (19.42 wt. %), 0.57 g Zeolyst CBV 300 Y-zeolite ($NH_4$-form, $SiO_2/Al_2O_3$ molar ratio=5.1), and 2.50 g sodium silicate. The liner was then capped, sealed inside a stainless steel autoclave, and heated at 135° C. under tumbling conditions (~50 rpm) inside a convection oven for 168 hours. The solids were then isolated by filtering, washing with deionized water, and drying in an oven at 95° C. in air.

The powder XRD shown in FIG. 1 is consistent with the product being pure phase FAU zeolite.

The as-made product had a $SiO_2/Al_2O_3$ molar ratio of 8.0, as determined by inductively coupled plasma atomic emission spectroscopy (ICP-AES).

A summary of the reaction mixture components, reaction conditions, and product description is provided in Table 2.

Example 2-7

Several high-silica Y-zeolites were prepared according to the reaction mixture components, reaction conditions, and product description provided in Table 2.

The powder XRD patterns of the as-synthesized products of Examples 2-7 (not shown) were consistent with pure phase FAU zeolite.

TABLE 2

| | | | | | Synthesis Gel Composition (molar) | | | | Product | |
|---|---|---|---|---|---|---|---|---|---|---|
| Ex. | Temp./ Time | Rotation | Reagent Mixture | OSDA | $SiO_2$/ $Al_2O_3$ | Na/ $SiO_2$ | OSDA/ $SiO_2$ | $H_2O$/ $SiO_2$ | XRD | $SiO_2/Al_2O_3$ (molar) |
| 1 | 135° C./ 168 h | 43 rpm | A | 1 | 13 | 0.50 | 0.15 | 30 | FAU | 8.0 |
| 2 | 135° C./ 168 h | 43 rpm | A | 1 | 13 | 0.50 | 0.15 | 23 | FAU | 6.7 |
| 3 | 135° C./ 168 h | 43 rpm | A | 1 | 30 | 0.65 | 0.15 | 23 | FAU | 6.1 |
| 4 | 135° C./ 240 h | 43 rpm | A | 1 | 30 | 0.65 | 0.15 | 30 | FAU | 8.6 |
| 5 | 135° C./ 72 h | 43 rpm | A | 2 | 30 | 0.65 | 0.15 | 30 | FAU | 6.8 |
| 6 | 135° C./ 72 h | 43 rpm | A | 3 | 30 | 0.65 | 0.15 | 30 | FAU | 7.4 |
| 7 | 95° C./ 336 h | — | B | 4 | 13 | 0.60 | 0.15 | 23 | FAU | 12.3 |

The following inorganic reagents were used in the following examples: Reagent Mixture A=sodium silicate (Sigma-Aldrich, 26.5 wt. % $SiO_2$, 10.6 wt. % $Na_2O$, 62.9 wt. % $H_2O$) as silica source, CBV 300 Y-zeolite (Zeolyst, $NH_4$-form, $SiO_2/Al_2O_3$ molar ratio=5.1) as alumina source, and 1 M NaOH solution; and Reagent Mixture B=colloidal silica (LUDOX® HS-30), sodium aluminate (Alfa Aesar, 54% $Al_2O_3$, 41% $Na_2O$), and 50% aqueous NaOH solution.

The following organic structure directing agents (OSDAs) were used in the following examples: [1] 1,2-dimethyl-3-(3-methylbenzyl) imidazolium hydroxide; [2] 1-ethyl-3-methylimidazolium hydroxide; [3] 1-butyl-3-methylimidazolium hydroxide; and [4] 1,2-dimethyl-3-(3-methylbenzyl) imidazolium chloride.

The invention claimed is:

1. A method of making a high-silica zeolite having an FAU framework structure, the method comprising:

(1) preparing a reaction mixture comprising:

(a) a source of silica;

(b) a source of alumina;

(c) a source of an alkali or alkaline earth metal cation [M];

(d) an organic structure directing agent [Q] comprising a 1,2-dimethyl-3-(3-methylbenzyl) imidazolium cation;

(e) a source of hydroxide ions [OH]; and (f) water;

(2) heating the reaction mixture under crystallization conditions including a temperature of from 80° C. to 200° C. for a time sufficient to form crystals of the high-silica zeolite; and (3) recovering at least a portion of the high-silica zeolite from step (2).

2. The method of claim 1, wherein the high-silica zeolite has a $SiO_2/Al_2O_3$ molar ratio of greater than 6.

3. The method of claim 1, wherein the source of silica comprises sodium silicate.

4. The method of claim 1, wherein the source of alumina is selected from the group consisting of an FAU zeolite having a $SiO_2/Al_2O_3$ molar ratio of from 2 to 5.5, an alkali metal aluminate, and mixtures thereof.

5. The method of claim 1, wherein the alkali metal cation [M] is selected from the group consisting of sodium, potassium, and mixtures thereof.

6. The method of claim 1, wherein the organic structure directing agent [Q] is in its hydroxide or chloride form.

7. The method of claim 1, wherein the reaction mixture has a composition, in terms of molar ratios, as follows:

| | |
|---|---|
| $SiO_2/Al_2O_3$ | 5 to 30 |
| $M/SiO_2$ | 0.05 to 0.90 |
| $Q/SiO_2$ | 0.05 to 0.30 |
| $OH/SiO_2$ | 0.10 to 1.20 |
| $H_2O/SiO_2$ | 10 to 60. |

8. The method of claim 1, wherein the reaction mixture has a composition, in terms of molar ratios, as follows:

| | |
|---|---|
| $SiO_2/Al_2O_3$ | 7 to 20 |
| $M/SiO_2$ | 0.10 to 0.70 |
| $Q/SiO_2$ | 0.10 to 0.25 |
| $OH/SiO_2$ | 0.20 to 0.95 |
| $H_2O/SiO_2$ | 15 to 40. |

9. The method of claim 1, wherein the crystallization conditions in step (2) include the heating under autogenous pressure.

10. The method of claim 1, further comprising treating the high-silica zeolite recovered in step (3) to remove at least part of the organic structure directing agent.

* * * * *